Dec. 4, 1962  J. A. M. BAY  3,066,983
COUPLING AND DUMPING SYSTEM
Filed Feb. 11, 1958  2 Sheets-Sheet 1
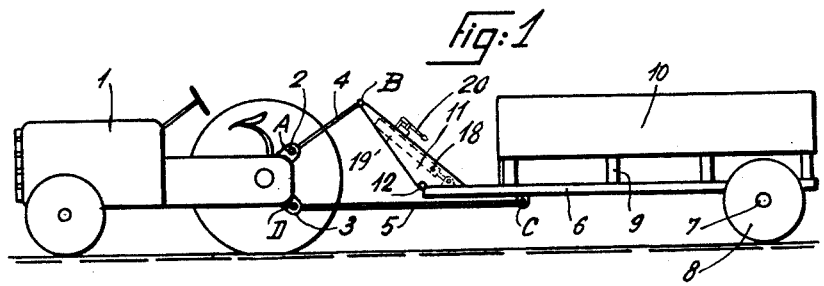
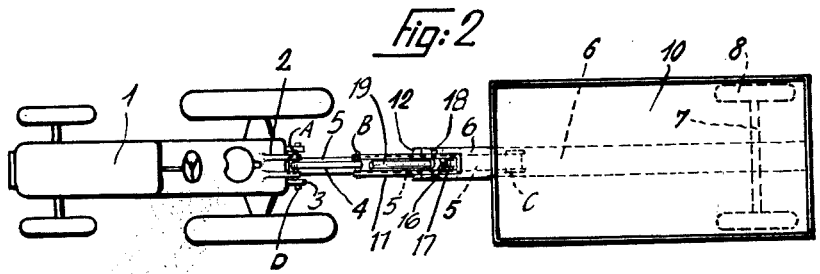
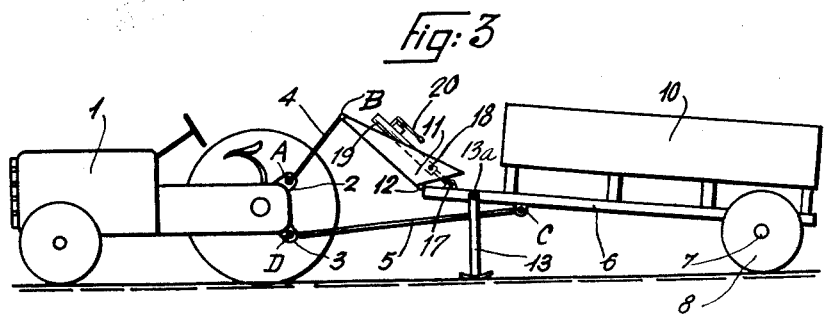
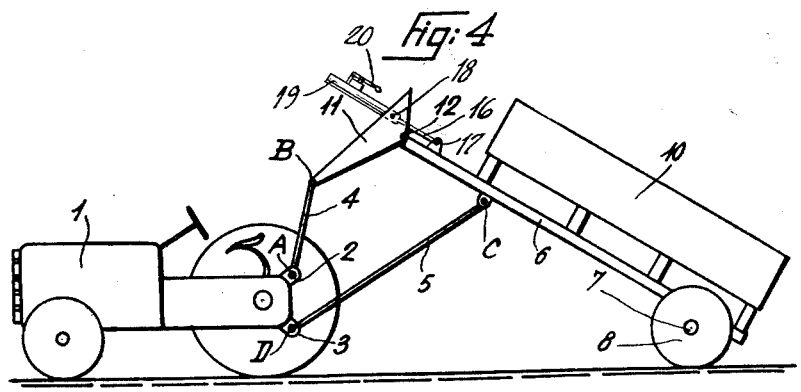
Inventor:
Jack A. M. Bay
by Robert Henderson
attorney Dec. 4, 1962 J. A. M. BAY 3,066,983
COUPLING AND DUMPING SYSTEM
Filed Feb. 11, 1958 2 Sheets-Sheet 2
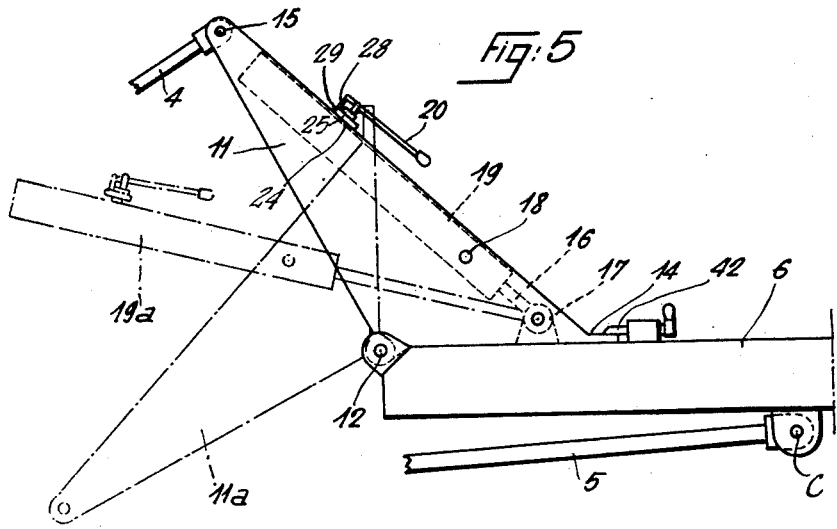
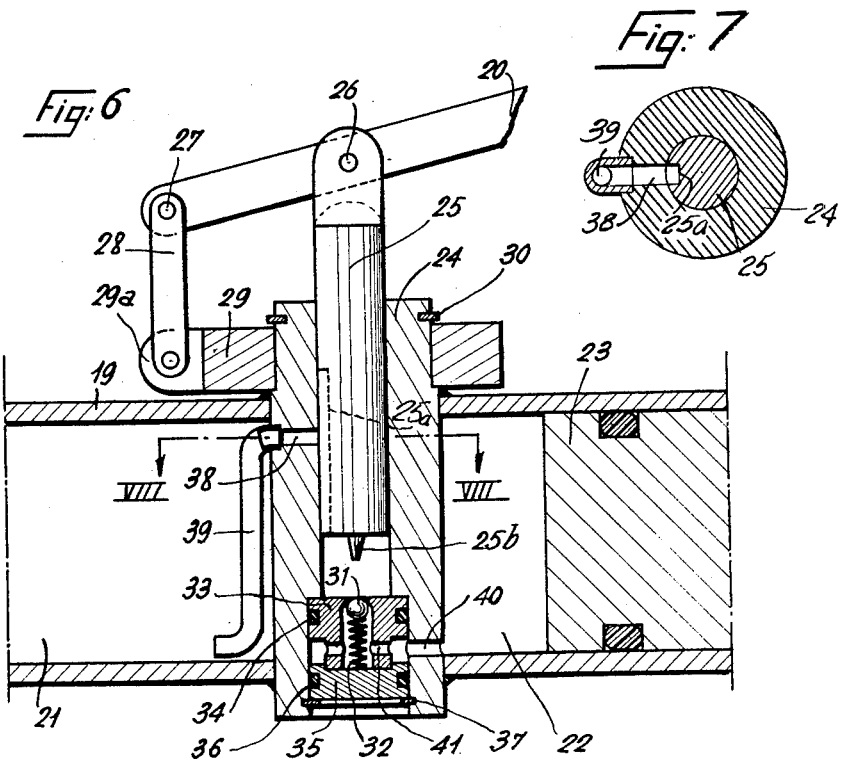
Inventor:
Jack A. M. Bay
by Robert Hedderson
attorney

United States Patent Office 3,066,983
Patented Dec. 4, 1962

3,066,983
COUPLING AND DUMPING SYSTEM
Jack A. M. Bay, Chartres, France, assignor of one-half to Societe d'Exploitation de Brevets de Machines Agricoles (S.E.B.M.A.) Chartres, France, a company of France
Filed Feb. 11, 1958, Ser. No. 714,527
Claims priority, application France Feb. 18, 1957
10 Claims. (Cl. 298—5)

This invention relates to semi-trailers, i.e., two-wheel trailers of the type wherein the single wheel axle is positioned at the rear of the trailer so that a substantial portion of the trailer load is supported on the truck or tractor vehicle to which the trailer is attached. One advantage of this type of trailer is that the grip of the tractor wheels on the road and hence stability is considerably increased.

However, difficulties are encountered with semi-trailer vehicles in cases where it is desired to provide a trailer of the tiltable or dumping type. Because the center of gravity of a semi-trailer is positioned substantially forward of the single wheel axle thereof, the dump body is generally hinged to the trailer chassis, and this complicates construction and increases cost.

In many semi-trailer systems an articulated linkage type coupling is used for transferring the load from the front part of the trailer to the tractor. Such a coupling essentially comprises a pair of link bars disposed in a common vertical plane and connecting two points on the trailer to two points on the tractor, with the upper link being stressed in compression and the lower in tension. It is an object of the present invention to provide an improved semi-trailer coupling system of the articulated linkage type just described and whereby the trailer chassis will be bodily tiltable about the single rearwardly positioned wheel axle of the semi-trailer.

In accordance with the invention the tensioned lower link (or draft bar) of an articulated linkage coupling assembly is arranged directly to connect the lower part of the tractor to the trailer chassis, while the compressed upper link bar has one end pivoted to the tractor and its other end pivoted to the upper end of a lever-like member the lower end of which rests on the trailer chassis and is pivoted with respect to the latter for pivotal movement forwardly of the trailer chassis.

Preferably the lever is in the general form of a triangle having lower side supported on a forward extension of the trailer chassis, and the pivot of said lever on the chassis is positioned at the apex of the triangle at the forward end of said side, while the upper apex of said triangle opposite to said side pivotally carries one end of the upper coupling link.

The ensuing description made with reference to the accompanying diagrammatic drawings, given by way of illustration and example but not of limitation, will provide a clear understanding of the manner in which the invention may be performed. In the drawings:

FIG. 1 is a side view of a semi-trailer vehicle according to the invention coupled to its tractor;

FIG. 2 is a corresponding plan view;

FIG. 3 illustrates in side view the same system with the trailer in slightly raised or tilted condition, as used, e.g., in parking;

FIG. 4 is a similar view showing the trailer in fully tilted, or dumping position.

FIG. 5 is a side view of one convenient form of an actuating system for the pivoted lever;

FIG. 6 is a detail view of said actuating system on an enlarged scale; and

FIG. 7 is a section taken on the line VII—VII of FIG. 6.

In the tractor-trailer combination shown in FIG. 1, the tractor 1 is shown as comprising, in conventional manner, an upper bracket 2 and a lower bracket 3 projecting from the rear of said tractor and pivotally coupled to the forward ends of the respective coupling links 4 and 5.

The lower link 5 has its rear end universally pivoted to the under side of the chassis 6 of a semi-trailer which includes a body 10, an axle 7 near its rear end and wheels 8 on said axle. The link 5 extends from the tractor to its pivotal connection at C on the chassis being disposed below the link 4 and below a lever 11 and a cylinder 19 hereinafter mentioned.

In the illustrated embodiment of the invention the chassis is in the form of a central longitudinal girder 6 having the load-carrying body 10 resting thereon by means of transverse cross members 9 secured to said body and said girder. Supported on the forward end of the girder 6 is the base of a lever 11 of generally triangular form, pivoted at 12 to the forward end of the girder 6; said lever, as shown in FIGS. 1 and 5, having one arm normally extending upwardly from the pivot point 12 and another arm normally extending rearwardly from said pivot point and resting upon said girder. The pivot 12 is positioned towards the forward end of said base of the lever, and preferably at the lower forward apex of the triangle, so as to allow, when the base of the lever rests on the girder 6, a pivotal movement of said lever forwardly. The rear end of the coupling link 4 is connected preferably through a universal joint to the upper apex of the triangular lever 11.

By reason of the rearward position of the axle 7, the trailer and its load tend to dip forwards. However, dipping is prevented by the lever 11 and the link 4. The link 4 is under compressive stress and the base of the lever 11 is firmly abutted against the girder 6. The lower link 5 mainly transmits the tractive pull to the trailer but is also under tension due to the unbalanced trailer weight.

The coupling arrangement thus described will be readily seen to comprise an articulated polygonal linkage assembly of various shapes including the four pivots A, B, C, D. According to the invention this linkage further includes the additional lever 11 and its pivot 12 which in the normal condition is inoperative, being blocked against pivotal movement owing to the load of the semi-trailer applied thereto and acting to abut the base of the triangular lever 11 down against the girder 6. Thus, it is seen that in the normal condition when the tractor is hauling the trailer the above coupling system acts as a conventional coupling system of the articulated quadrilateral linkage type.

However, with the system at rest the lever 11 can be pivoted forward relative to the chassis so as to change the position of the articulated polygonal linkage A—B—12—C—D thereby to tilt the trailer bodily about the axle 7.

A slight raising of the girder 6 involving a correspondingly slight forward pivoting of the lever member 11 may be obtained with the use of a conventional prop 13 (FIG. 3) pivoted at 13a to the girder 6 and having a curved base 13b. The prop, normally carried under the chassis in parallel relationship therewith, is released and the base 13b comes into contact with the ground. Hence, by a forward or backward movement of the tractor (according as the prop 13 is at rest position under the chassis respectively directed forwards or backwards) the chassis girder 6 is raised and the lever member 11 pivots slightly forward. The trailer is thus in a balanced condition independently of the tractor for parking purposes. In such position the pivots A, B, C, D are released for free movement thereby facilitating the operations involved in coupling and uncoupling the trailer to and from the tractor.

A greater movement of the lever 11 with respect to the girder 6 is required to tilt the trailer, FIG. 4. This may be achieved with any suitable power means providing a forward pivoting of the lever 11 and thereby producing a large variation in shape of the polygonal linkage A, B, 12, C, D. The power means may be of mechanical, hydraulic, electric or other character, carried on the tractor or the trailer or provided by an external source. By way of example, a simple conventional jack hoist or screw jack may be used to raise the girder 6 off the ground. Alternatively a pulling force may be exerted on the upper end of the lever 11 to pivot forward the latter; or yet other methods may be used to the same effect.

According to a preferred embodiment of the invention, in order to make the trailer substantially independent of the tractor the power source is preferably carried on the semi-trailer and is arranged to act between a surface of the semi-trailer, such as the chassis thereof, and the lever 11, in a direction to pivot the lever forwardly. One example of such a construction will now be described with reference to FIG. 5.

In this construction the lever 11 comprises a pair of spaced parallel triangular plates having corresponding apices pivoted to the fulcrum 12 symmetrically on opposite sides of the center girder 6 and interconnected at each of the other remaining pairs of corresponding apices, respectively by a cross bar 14 and a pivot shaft 15 on which is pivoted the rear end fork or clevis of the upper coupling bar or link 4. A latching device 42 cooperating with the cross member 14 may be used to retain the lever in its normal position in abutment against the chassis girder 6 if desired. Disposed between the two plates is an hydraulic jack cylinder-and-piston assembly having its piston rod 16 pivoted to a bracket 17 secured to the girder 6 and its cylinder 19 pivoted on journals 18 in the plates.

When fluid under pressure is supplied to the jack cylinder the piston rod is extended outwards and the lever and jack assembly respectively assume the position shown in chain lines at 11a and 19a. The fluid for the actuator may be oil delivered by a pump which may be driven from the tractor motor. However, in the illustrated construction the hydraulic jack pump is shown as operated by pump having a hand pump having a lever 20 arranged within easy reach of the tractor driver. A preferred construction of the pump is illustrated in FIG. 6.

The actuator cylinder or body is shown at 19, and the pump is mounted transversely of the body 19 so as to divide it longitudinally into two separate compartments, one compartment 21 serving as an oil reservoir or sump and formed at its top with a small vent aperture (not shown) and another compartment 22 providing the actuator cylinder proper in which the actuator piston 23 is slidable. The piston rod 16, not shown in FIG. 6, is connected with the right hand side of the piston in that figure. The pump comprises a cylindrical body 24 having a plunger 25 slidable in an axial bore thereof.

The plunger 25 is arranged to be manually reciprocated by means of the lever 20 pivoted at 26 to the forked upper end of the plunger and having one end pivoted at 27 to the upper end of a link 28 the lower end of which is pivoted in a clevis 29a extending from a collar 29 rotatably surrounding the pump body 24. The collar 29 is retained in position axially by a snap-ring 30. The plunger 25 is formed with a longitudinal groove 25a (see FIG. 7) extending part of the length of the plunger from the bottom end of it, and a tapered nose 25b projects downwards from said bottom end of the plunger.

Fitted in the lower end of the pump body is a check-valve assembly comprising a ball 31 pressed upwardly by a spring 32 to a seated position against a valve seat formed at the top of a member 33 force-fitted in a recess at the lower end of the pump body with the provision of a seal ring 34 in a peripheral groove of the member 33. The spring 32 has its lower end abutted against the top of another member 35 similarly force-fitted in the lower recess of the pump body and including a seal ring or packing 36 in a groove thereof, the member 35 being retained by a spring clip or snap ring 37.

Oil is admitted into the pump body by way of a lateral inlet port 38 thereof having an auxiliary supply tube 39 connected with it and so formed that the oil will still be allowed to enter the pump body from the reservoir 21 as the store of oil is gradually depleted the jack 19 approaches the horizontal position 19a and the piston 23 approaches the end of its stroke in the jack. The oil is discharged from the pump by way of an outlet port 40 which at its outer end connects with the actuator cylinder space 22 and at its inner end is connected through ports 41 with the bore in valve member 35 below the ball valve 31. The pump described operates as follows.

It is first noted that the assembly including pump plunger 25, lever 20, link 28 and collar 29 is bodily rotatable about the axis of the plunger 25, and that in all angular positions of said assembly outside a small angular range including the particular angular position shown in FIGS. 5, 6 and 7 wherein the lever 20 is downwardly directed, the groove 25a is out of register with the inlet port 38. Hence, in order to operate the pump to tilt the trailer body to dumping position, the lever 20 is first turned so as to put the groove 25a out of registry with the inlet port 38. In this condition, raising the lever 20 to its uppermost position will lift the plunger 25 to create a vacuum in the pump body and oil enters through the port 38 as soon as the bottom of the plunger 23 is above said port. Subsequent lowering of the lever 20 will discharge the oil from the pump body through the discharge valve assembly unseating ball 31 against spring 32 and feeding oil through ports 41 and 40 into actuator cylinder space 22. This will extend the piston rod 16 and will move the trailer towards its dumping position. It will be noted that due to the rotatable mounting of the above-noted pump plunger and lever assembly the driver can at all times bring the lever to a convenient position for pumping operation. Namely, the lever 20 may be rotated towards the right or the left and actuated by the driver without getting down from one's tractor.

To lower the trailer body back to its normal position, the lever 20 is turned to the position shown in FIGS. 5, 6 and 7, i.e., downwardly directed, wherein groove 25a registers with inlet port 38, then the lever is pressed down so that the point 25b unseats the ball 31. Under the action of the weight of the trailer body acting on the piston 23, oil is forced back into the reservoir compartment 21. The plunger 25 being fully depressed, the lever 20 may be slightly rotated so as to adjust the oil flow passage defined between the upper end of groove 25a and the inlet port 38 whereby a smooth and gradual lowering of the trailer body is obtained.

It will of course be understood that various modifications may be made in the structure described and illustrated by way of example without exceeding the scope of the present invention as defined in the claims hereof.

What is claimed is:

1. In combination, a tractor having a rear wheel axle, a trailer having a chassis and a rear wheel axle supporting the chassis, an inextensible draft link having respective ends pivotally connected to the tractor below the axle thereof and to the underside of the trailer chassis rearwardly with respect to the front end of said chassis, a compression link having one end pivotally connected to the tractor above the axle thereof, a lever having a transverse pivotal connection with the front end of said chassis and having one arm jutting upward from said chassis and means pivoting said arm to the other end of the compression link, said lever including another arm extending rearwardly into abutting engagement with said chassis of said trailer in the lowered position, and means for imparting pivotal movement to said lever relative to said trailer about the pivotal connection therebetween, whereby to tilt the trailer chassis about its rear axle to a dumping position.

2. The combination claimed in claim 1, wherein said lever has the general form of a triangle with one apex thereof pivotally connected to the trailer chassis, the upwardly jutting lever arm being defined by another apex of the triangle, and the rearwardly extending lever arm being defined by the side of the triangle opposite to said other apex thereof.

3. The combination claimed in claim 1, wherein said lever comprises two spaced parallel generally triangular plates, and said lever-pivoting means comprises a fluid pressure actuator including a cylinder element and a piston element mounted between said side plates and having one element connected to said chassis and the other element connected to said lever.

4. The combination claimed in claim 1, wherein said lever-pivoting means comprises a fluid pressure actuator including a cylinder element and a piston element, one of said elements being pivotally connected with the chassis and the other element pivotally connected with said lever, a reservoir for hydraulic fluid disposed in coaxially aligned relation with said cylinder element, and a manually operable fluid pump integral with said reservoir and said cylinder element and extending between said reservoir and said cylinder element transversely thereof, said pump being operable to deliver fluid from said reservoir to said cylinder for operating said lever actuator.

5. The combination claimed in claim 1, wherein said lever-pivoting means comprises a fluid pressure actuator including a cylinder element and a piston element, one said element being connected with the chassis and the other element connected with said lever, a reservoir for hydraulic fluid disposed in coaxially aligned relation with said cylinder element, a fluid pump integral with and extending between said reservoir and cylinder transversely thereof, said pump including a manual operating assembly angularly rotatable about an axis transverse to said cylinder and operable in one angular position of said assembly to deliver fluid from said reservoir into said cylinder to operate the actuator in such manner as to pivot the lever relative to the chassis to a dumping position of the latter, and operable in another angular position of said assembly for controllably releasing pressure fluid from said cylinder through said pump into said reservoir to operate the actuator in reverse to permit the lever to return to its normal position in abutment with the chassis.

6. The combination claimed in claim 5, wherein said pump comprises a pump body having a bore transverse to said cylinder, a plunger slidably reciprocable and rotatable in said bore, inlet and outlet ports in said body respectively connecting said bore with said reservoir and said cylinder, a check-valve in said outlet port, a manual operating member for rotating the plunger in the bore and for slidably reciprocating the plunger in any rotated position thereof so as to draw in fluid from the reservoir through the inlet port into the bore in one reciprocated position of the plunger and discharge said fluid under pressure through the outlet port and check-valve into the cylinder in another reciprocated position, a passage in said plunger adapted to register with said inlet port in one angular position of the plunger for establishing a communication from said reservoir into said bore in said other reciprocated position of the plunger, and means for forcibly opening said check-valve in the said other reciprocated position of the plunger.

7. A dump semi-trailer adapted to be coupled to a tractor of the type having an upper rear coupling connection above the rear axle thereof and a lower coupling connection below said axle, comprising a chassis having road wheels at its rearward end and a protruding forward portion, a load carrier fixedly mounted on said chassis, an upright arm carried by said protruding portion having a base resting on said portion and connected therewith through a transverse pivoting connection located in the extreme forward portion of said base, the upper part of said arm being provided with a coupling connection for a link connecting said coupling connection to the upper connection of the tractor, and a further coupling connection secured to the underside of said chassis rearwardly with respect to said arm, said further connection being intended for a further link connecting said further connection to the lower coupling connection of the tractor.

8. A dump semi-trailer according to claim 7, further comprising a hydraulic jack having a piston element and a cylinder element, one of said elements having a transverse pivotal connection with the chassis rearwardly of the transverse pivotal connection of the arm with the chassis, the other of said elements having a transverse pivotal connection with the arm, and means for supplying said jack with a fluid under pressure.

9. In a vehicle tilting system, in combination, a tractor, a trailer having a chassis, an approximately horizontal draft bar having its forward end pivoted at a fixed point on the tractor toward the latter's rear end and its rearward end pivoted at a first fixed point on the trailer's chassis rearwardly of the latter's forward end, a compression link having its lower end pivoted to said tractor toward the latter's rear end and extending upwardly with its upper end substantially above said draft bar, a lever pivotally connected to the upper end of said compression link and at a second fixed point on said trailer's chassis forwardly of the latter's said first fixed point, the portion of the chassis between its two said fixed points constituting one arm of a downwardly pointing toggle and said lever constituting the other arm of the same toggle, which arms are in angular interrelationship when the trailer is non-tilted, and means coacting with said toggle to lengthen it to pivot said arms upwardly and thereby raise the forward end of the chassis.

10. In a hydraulic pressure fluid actuator system, in combination, a fluid reservoir casing, an actuator cylinder in axially aligned relation with said casing and a piston slidable in said cylinder, a pump body secured in said casing between said reservoir and cylinder and having a bore transverse to said cylinder, inlet and outlet ports in said body respectively connecting said bore at axially spaced points thereof with said casing and said cylinder, a plunger slidably reciprocable in said bore for controlling flow communication between said ports and angularly rotatable in said bore, a check-valve in said outlet port, a manual operating member for rotating the plunger in the bore and for slidably reciprocating the plunger in any rotated position thereof, a passage in said plunger adapted to register with said inlet port in one angular position of the plunger and means on said plunger for forcibly opening said check-valve in one reciprocated position of the plunger whereby fluid is allowed to flow from said cylinder through said pump into said casing in said one reciprocated position of the plunger.

References Cited in the file of this patent

UNITED STATES PATENTS

| | | |
|---|---|---|
| 1,748,782 | McBride | Feb. 25, 1930 |
| 2,096,574 | Denny | Oct. 19, 1937 |
| 2,347,898 | Ferguson | May 2, 1944 |
| 2,473,694 | Renick | June 21, 1949 |
| 2,487,096 | Bunting | Nov. 8, 1949 |
| 2,554,127 | Simmons | May 22, 1951 |
| 2,557,880 | Lynn | June 19, 1951 |
| 2,628,126 | Black | Feb. 10, 1953 |
| 2,698,199 | Godbersen | Dec. 28, 1954 |
| 2,718,431 | Pietroroia | Sept. 20, 1955 |
| 2,815,646 | Swanson | Dec. 10, 1957 |
| 2,832,486 | Clark | Apr. 29, 1958 |
| 8,853,341 | Morse | Sept. 23, 1958 |
| 2,890,909 | Hutchinson | June 16, 1959 |

UNITED STATES PATENT OFFICE
CERTIFICATE OF CORRECTION

Patent No. 3,066,983                            December 4, 1962

Jack A. M. Bay

It is hereby certified that error appears in the above numbered patent requiring correction and that the said Letters Patent should read as corrected below.

Column 2, line 70, for "trailer," read -- trailer about its axle 7 for dumping operations, as shown in --; column 3, line 39, for "pump having a hand pump having a lever 20 arranged" read -- hand lever 20 arranged --.

Signed and sealed this 14th day of May 1963.

(SEAL)
Attest:

ERNEST W. SWIDER                          DAVID L. LADD
Attesting Officer                            Commissioner of Patents